Oct. 11, 1927.

W. P. DALRYMPLE

PRESSURE GAUGE

Filed Aug. 6, 1924

1,645,184

Witness
Milton Lenoir

Inventor
William P. Dalrymple;
By John L. Jackson
Attorney

Patented Oct. 11, 1927.

1,645,184

UNITED STATES PATENT OFFICE.

WILLIAM P. DALRYMPLE, OF CHICAGO, ILLINOIS.

PRESSURE GAUGE.

Application filed August 6, 1924. Serial No. 730,383.

My invention relates to pressure gauges, and has for its object to provide an improved gauge simple in construction and that will operate reliably under air or other fluid pressure. I accomplish this object as illustrated in the drawings and as hereinafter described. What I regard as new is set forth in the claims.

In the accompanying drawing,—

Figure 2:
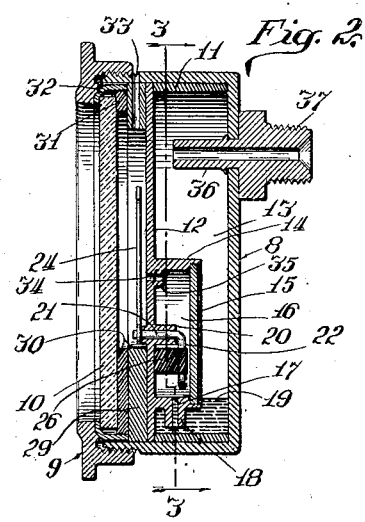
Fig. 2 is a vertical cross-section on line 2—2 of Fig. 1.

In the embodiment of my invention illustrated in the drawing, the operating parts of the gauge are enclosed in a suitable housing comprising a cylindrical cup-like shell or case 8, the marginal portion of which is externally screw-threaded to receive a bezel ring 9 which serves to secure in place a glass 10 at the front of the gauge which protects the contents of the case. The manner in which the glass 10 is supported at the rear will be hereinafter explained. Fitted snugly within the case 8 is a sleeve 11, the outer margin of which forms a seat to support the marginal portion of a circular partition plate 12 which fits closely in the case 8, as shown in Fig. 2, forming a chamber 13 in the inner portion of the case. The plate 12 is provided with a laterally projecting annular flange 14 eccentrically disposed with relation to said partition plate and extending into the chamber 13, as shown in Fig. 2. The flange 14 is preferably integral with the plate 12, and it is so placed that when the gauge is in its normal position said flange is at the lower part of the gauge and its lower margin is a short distance above the bottom thereof. Near its free margin the flange 14 is provided with a circular plate 15 tightly secured thereto by a pressed fit, or in any other suitable way, to form a circular chamber 16, the side walls of which are formed by the plates 12 and 15 while its outer wall is formed by the flange 14. For convenience of description the chamber 16 will be hereinafter referred to as the "float chamber," and the chamber 13 as the "pressure chamber." The float chamber 16 communicates with the pressure chamber 13 through a small duct 17 in a nipple 18 projecting downwardly from the lowermost point of the flange 14, so that the lower end of the duct 17 is quite close to the bottom of the pressure chamber. The pressure chamber is provided with a small quantity of mercury, indicated by 19, and a sufficient quantity of mercury is provided so that the lower end of the nipple 18 is always submerged when the gauge is in its normal position.

Figure 1:
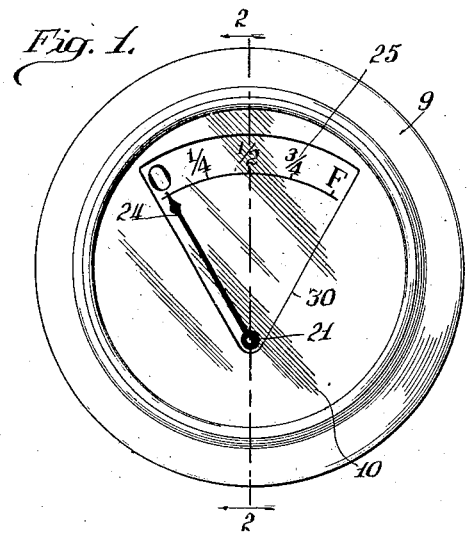
Fig. 1 is a front elevation of my improved gauge, showing the dial plate and indicating hand.
Figure 3:
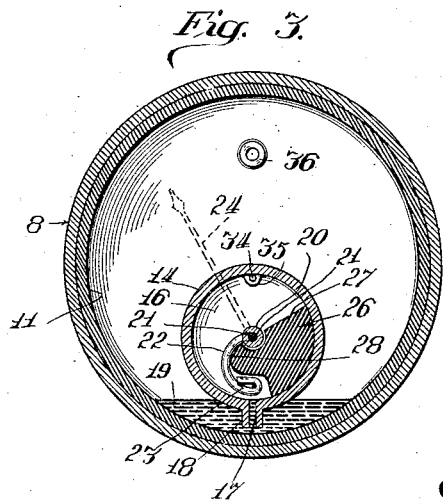
Fig. 3 is a vertical section on line 3—3 of Fig. 2, showing the parts in their normal position, i. e., with the hand at zero.
Figure 5:
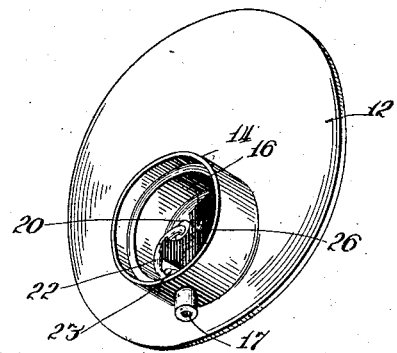
Fig. 5 is a perspective view of the partition plate and the parts carried thereby.
Figure 4:
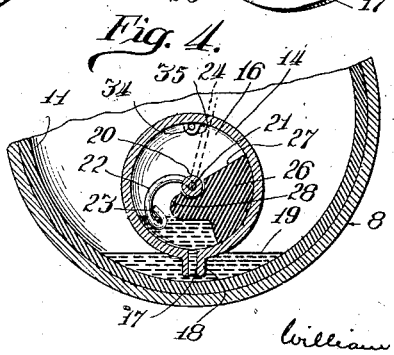
Fig. 4 is a similar view, partly broken away, showing the position of the parts when the gauge is under pressure.
Figure 6:
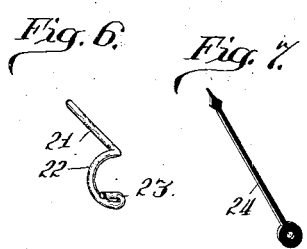
Fig. 6 is also a perspective view of the float arm through which the hand is actuated.
Figure 7:
Fig. 7 is a perspective view of the hand.

Extending into the float chamber 16 is a concentrically disposed sleeve 20 which registers with an opening in the plate 12, by which arrangement a bearing is provided for the pivot element 21 of a float arm 22, the float portion of which is indicated by 23 in the drawings. Said float is preferably made of a piece of wire bent upon itself at one end to form the float portion 23. As shown in Figs. 2 and 6, the pivot element 21 is bent at right angles to the arm 22, and is journaled in the bearing provided within the sleeve 20. The element 21 extends through the plate 12 and carries an indicating hand 24, as indicated in Fig. 2. The arrangement is such that by swinging the float arm about its pivot the hand 24 will swing over the outer face of the plate 12, the upper portion of which is provided with a graduated scale 25 so that it forms a dial plate. The position of the hand 24 with reference to the float arm 22 and the float 23 is such that when the float is free to assume its lowermost position in the float chamber 16 under the action of gravity the hand 24 will stand at its zero position, as indicated in Fig. 1. When, however, the float is moved upward by the entrance of mercury into the float chamber, as will be hereinafter described, the hand 24 swings in a clockwise direction over the indicating scale. Preferably the hand 24 is made of steel and is magnetized, and the plate 12 is made of soft iron, so that the magnetic action of these parts will have a damping effect on the hand and cause it to operate more smoothly and steadily. To prevent the hand 24 from swinging to the left beyond its zero point, and also to reduce the idle capacity of the float chamber so that a less quantity of mercury will be required and the sensitiveness of the gauge will be increased, a block 26 of fiber or other suitable non-magnetic material is placed in the float chamber as shown in Figs. 3 and 4. As therein shown, said block is, in the main, segmental in form and is placed at one side of the center of such chamber so that it does not obstruct the upper end of the duct 17. The upper surface of said block is flat and inclined, as shown at 27 in Fig. 2, its inclined surface occupying a radial position. At its lower side said block is provided with a rounded shoulder 28 which overlies the duct 17 and is adapted to form a stop for the float arm 22 which, as shown, is curved in approximately semi-circular form. The outer portion of said block contacts with the inner surface of the float chamber from a point near the inner end of the duct 17 to a point approximately one hundred degrees therefrom. The arrangement is such that while the shoulder 28 serves as a stop to limit the movement of the hand 24 in one direction, the inclined surface 27 thereof serves as a stop to limit its movement in the opposite direction, and the block itself reduces the capacity of the float chamber and increases the sensitiveness of the gauge.

Fitted against the outer face of the plate 12 is a masking plate 29 having a segmental opening 30 therein to expose the hand and the scale of the dial plate. Said masking plate also serves as a filler block which aids in spacing the glass 10 from the plate 12, as shown in Fig. 2. Preferably between the glass 10 and the mask plate 29 is a rubber gasket 31 for cushioning the glass, so that it is not liable to be fractured by jolts and jars, and I also prefer to provide a metallic collar 32 between the bezel ring 9 and the marginal portion of the glass 10, as shown in said figure. This collar extends inwardly to and engages with the marginal portion of the mask plate 29, so that the bezel ring serves directly to clamp said mask plate and the partition plate 12 in position, as well as to hold the glass in place. Extending through the upper portion of the mask plate 29 and through the case 8 is a passage 33 which serves as a vent for the space between the glass 10 and the plate 12, and connecting said space with the interior of the float chamber 16 at the upper portion thereof is a vent passage 34 through the plate 12. The inner end of said passage is formed by a nipple 35 which projects into the float chamber 16, as shown in Fig. 2. The purpose of these two vent passages is to permit air to escape from the float chamber 16 when the mercury is forced thereinto, and, conversely, to prevent the formation of a vacuum in said chamber when the pressure on the gauge is relieved.

Extending through the bottom of the case 8 near the upper portion thereof when the gauge is in its normal position, is a tube 36, the outer portion of which is screwthreaded to form a nipple 37 for the attachment of a hose pipe or other connection from the source of supply of fluid the pressure of which is to be indicated. Said tube may be secured in any suitable way, as by swaging it against the inner surface of the bottom 8, as shown in Fig. 2. The sleeve 36 extends far enough beyond the inner face of the case 8 so that mercury cannot run out through it when the gauge is handled, and the nipple 35 and sleeve 20 serve a similar purpose.

The operation of my improved gauge is as follows: When the gauge is not under pressure the parts assume the position shown in Figs. 1 to 3, the float 23 being then in its lowermost position. Preferably the quantity of mercury placed in the pressure chamber 13 is such that in the absence of pressure the level of the mercury will be just below the float. When fluid pressure is admitted to the pressure chamber 13, the pressure on the surface of the mercury in said chamber causes an upward flow of the mercury through the duct 17 into the float chamber 16, which thereupon raises the float, as shown in Fig. 4, rocking the float arm 22 in a clockwise direction and consequently moving the hand 24 in the same direction, the movement of the hand corresponding with the pressure, and by properly calibrating the scale a very accurate registration of the pressure may be obtained. By reason of the fact that the float arm 22 is of much shorter radius than the hand 24, and the capacity of the float chamber or receptacle is comparatively small, obviously the scale may be graduated so that considerable movement of the hand is required to indicate a comparatively slight change of pressure. The gauge, therefore, is well adapted for use in situations where great accuracy is required, as a very small quantity of mercury need be used, and by provision of the nipple 35 and sleeves 20 and 36 danger of loss of mercury by the tipping of the gauge or when it lies flat for shipment or storage is avoided. By making the upper surface of the block 26 inclined as described, any mercury entering the float chamber when the gauge is tipped from its normal position will at once drain back into the pressure chamber when the gauge is again righted. It will be noted that the glass is separated from the pressure chamber containing the mercury by the partition plate, and that provision is made for preventing the mercury from spilling out of the pressure chamber through said partition plate. Consequently, even though the glass should be broken, there is no danger of loss of mercury on that account.

While I prefer to use mercury in the pressure chamber, as it gives the best results, my invention is not limited to its use, as any other suitable liquid may be employed. Furthermore, the construction described may be modified in various respects without departing from the essential features of my invention pointed out in the more generic claims, and such claims are therefore not intended to be limited to the precise construction shown and described.

What I claim as my invention and desire to secure by Letters Patent, is:—

1. A pressure gauge comprising a suitable casing, a metallic partition plate therein forming therewith a pressure chamber at one side of said partition plate, a float chamber in the lower portion of said pressure chamber and communicating therewith below the level of the liquid therein, whereby variation of the pressure in said pressure chamber will vary the height of the liquid in said float chamber, a float located in said float chamber and pivotally mounted on said partition plate, and a magnetized indicator connected with the pivot of said float and disposed at the opposite side of said partition plate from said pressure chamber.

2. A pressure gauge comprising a suitable casing, a partition plate therein forming therewith a pressure chamber at one side of said partition plate, a float chamber in the lower portion of said pressure chamber and communicating therewith below the level of the liquid therein, whereby variation of the pressure in said pressure chamber will vary the height of the liquid in said float chamber, a float located in said float chamber and pivotally mounted on said partition plate, an indicator connected with the pivot of said float and disposed at the opposite side of said partition plate from said pressure chamber, and a vent through said partition plate and communicating with the upper portion of said float chamber.

3. A pressure gauge comprising a suitable casing, a partition plate therein forming therewith a pressure chamber at one side of said partition plate, a float chamber in the lower portion of said pressure chamber and communicating therewith below the level of the liquid therein, whereby variation of the pressure in said pressure chamber will vary the height of the liquid in said float chamber, a float located in said float chamber and pivotally mounted on said partition plate, an indicator connected with the pivot of said float and disposed at the opposite side of said partition plate from said pressure chamber, and a block in said float chamber for reducing the capacity thereof and limiting the movement of the float therein.

4. A pressure gauge comprising a suitable casing, a partition plate therein forming therewith a pressure chamber, a flange carried by said partition plate and projecting laterally into said pressure chamber, a closure for the marginal portion of said flange forming therewith a float chamber, a passage connecting the lower portion of said float chamber with the lower portion of said pressure chamber, a sleeve carried by said partition plate and projecting into said float chamber, a float having a pivot member journaled in said sleeve, and an indicator mounted on said pivot member at the opposite side of said partition plate.

5. A pressure gauge comprising a cylindrical casing, a sleeve fitted closely within the peripheral portion of said casing, a partition plate bearing against the outer portion of said sleeve forming with said casing a pressure chamber, a bezel ring screwed upon said casing, a ring disposed between said bezel ring and said partition plate, whereby said bezel ring serves to clamp said partition plate in position, a float chamber carried by said partition plate, a passage connecting the lower portion of said float chamber with the lower portion of said pressure chamber, a float in said float chamber pivotally supported by said partition plate, an indicator connected with the pivot of said float adapted to swing over the outer surface of said partition plate, and means for admitting fluid under pressure to said pressure chamber.

6. A pressure gauge comprising a cylindrical casing, a sleeve fitted closely within the peripheral portion of said casing, a partition plate bearing against the outer portion of said sleeve forming with said casing a pressure chamber, a bezel ring screwed upon said casing, a ring disposed between said bezel ring and said partition plate, whereby said bezel ring serves to clamp said partition plate in position, a float chamber carried by said partition plate, a passage connecting the lower portion of said float chamber with the lower portion of said pressure chamber, a float in said float chamber pivotally supported by said partition plate, an indicator connected with the pivot of said float adapted to swing over the outer surface of said partition plate, a glass extending over the outer face of said partition plate and held in position by said bezel ring, a vent opening in said casing, a vent opening leading from the float chamber through said partition plate, and means for admitting fluid under pressure to said pressure chamber.

7. A pressure gauge comprising a casing defining a pressure chamber containing a suitable liquid, means forming a receptacle communicating with said pressure chamber below the level of the liquid therein, whereby variation of the pressure in said pressure chamber will vary the height of the liquid in said receptacle, a metallic dial plate, a magnetized indicator movable over said dial plate, and means connected with said indicator and actuated by variation in the level of the liquid in said receptacle to move said indicator.

8. A pressure gauge comprising a casing defining a pressure chamber containing a suitable liquid, means forming a float chamber communicating with said pressure chamber below the level of the liquid therein, whereby variation of the pressure in said pressure chamber will vary the height of the liquid in said float chamber, a metallic dial plate, a magnetic indicator movable over said dial plate, and a float in said float chamber connected with said indicator for actuating the same.

WILLIAM P. DALRYMPLE.